US011687784B2

United States Patent
Lim et al.

(10) Patent No.: US 11,687,784 B2
(45) Date of Patent: Jun. 27, 2023

(54) GPU-BASED ARTIFICIAL INTELLIGENCE SYSTEM USING CHANNEL-LEVEL ARCHITECTURE SEARCH FOR DEEP NEURAL NETWORK

(71) Applicant: Daegu Gyeongbuk Institute of Science and Technology, Daegu (KR)

(72) Inventors: Hee Chul Lim, Gyeonggi-do (KR); Min Soo Kim, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 707 days.

(21) Appl. No.: 16/281,582

(22) Filed: Feb. 21, 2019

(65) Prior Publication Data

US 2020/0250536 A1     Aug. 6, 2020

(30) Foreign Application Priority Data

Feb. 1, 2019 (KR) .......................... 10-2019-0013975

(51) Int. Cl.
G06N 3/082 (2023.01)
G06N 3/063 (2023.01)

(52) U.S. Cl.
CPC ............. *G06N 3/082* (2013.01); *G06N 3/063* (2013.01)

(58) Field of Classification Search
CPC ............................... G06N 3/082; G06N 3/063
(Continued)

(56) References Cited

U.S. PATENT DOCUMENTS 5,544,280 A * 8/1996 Liu ...................... G06N 3/0675
706/18
9,396,033 B2   7/2016 Lee
(Continued)

FOREIGN PATENT DOCUMENTS

KR            101594915         2/2016
KR           20170096018         8/2017
(Continued)

OTHER PUBLICATIONS

Chen, et al., "Joint Neural Architecture Search and Quantization", arXiv:1811.09426v1 [cs.CV] Nov. 23, 2018 (Year: 2018).*
(Continued)

*Primary Examiner* — Omar F Fernandez Rivas
*Assistant Examiner* — Shamcy Alghazzy
(74) *Attorney, Agent, or Firm* — Hauptman Ham, LLP

(57) ABSTRACT

An artificial intelligence system and a method for searching for an optimal model are provided. A method for searching for a learning mode of an artificial intelligence system includes receiving, by an operator included in a first node, first channels, deriving, by the operator included in the first node, first parameter weight indexes corresponding to weights of first parameters by calculating the first parameters corresponding to each of the received first channels with the received first channels, generating and outputting a second channel group by combining the first channel with the other channel, receiving, by an operator included in a second node, second channels included in the second channel group, and deriving, by the operator included in the second node, second parameter weight indexes corresponding to weights of second parameters by calculating the second parameters corresponding to the received second channels with the received second channels.

7 Claims, 8 Drawing Sheets

(58) Field of Classification Search
USPC .......................................................... 706/15
See application file for complete search history.

(56) References Cited

U.S. PATENT DOCUMENTS

| | | | |
|---|---|---|---|
| 10,572,824 B2* | 2/2020 | Chamberlain | G06F 3/0683 |
| 2017/0061326 A1 | 3/2017 | Talathi | |
| 2017/0213156 A1* | 7/2017 | Hammond | G06N 3/045 |
| 2018/0357543 A1* | 12/2018 | Brown | G06N 3/044 |
| 2019/0258251 A1* | 8/2019 | Ditty | G06F 15/7807 |
| 2021/0232897 A1* | 7/2021 | Bichler | G06N 3/0454 |

FOREIGN PATENT DOCUMENTS

| | | |
|---|---|---|
| KR | 20180044295 | 5/2018 |
| WO | 2016096308 | 6/2016 |

OTHER PUBLICATIONS

Korean Notice of Preliminary Rejection for corresponding Korean application No. 10-2019-0013975 dated Sep. 18, 2020.
Korean Notice of Decision of Rejection for corresponding Korean application No. 10-2019-0013975 dated Nov. 27, 2020.
Pavlo Molchanov et al.,"Pruning Convolutional Neural Networks for Resource Efficient Inference", 5th International Conference on Learning Representations, Jun. 8, 2017, cited in NPL Nos. 1 and 2.
Gabriel Bender et al., "Understanding and Simplifying One-Shot Architecture Search", 35th International Conference on Machine Learning, Jul. 10, 2018, Stockholm, Sweden, cited in NPL Nos. 1 and 2.

\* cited by examiner

GPU-BASED ARTIFICIAL INTELLIGENCE SYSTEM USING CHANNEL-LEVEL ARCHITECTURE SEARCH FOR DEEP NEURAL NETWORK

CROSS-REFERENCE TO RELATED APPLICATION

This application is based on and claims priority under 35 U.S.C. 119 to Korean Patent Application No. 10-2019-0013975, filed on Feb. 1, 2019, in the Korean Intellectual Property Office, the disclosure of which is herein incorporated by reference in its entirety.

BACKGROUND

Field

Apparatuses and methods consistent with the present disclosure relate to an artificial intelligence (AI) system and a method for generating a learning model, and more particularly, to an AI system and a method for generating a learning model that search for an optimal model a greater number of cases.

Description of the Related Art

A design for a task of a deep neural network (DNN) that exists so far is a professional task to deal with a great deal of hyperparameters and requires a lot of experience and knowledge. Therefore, an architecture search of an artificial intelligence (AI) model is difficult to solve.

In recent years, a development direction of a deep neural network model is changed from how efficient models may be designed for specific tasks to how competitive is a hyperparameter automatic search, which may search for a search space that may not be considered by a manual method, compared to the conventional manual design method.

The characteristic of the existing technology developed so far is that a method of architecture design may be classified into a single task manual architecture, a single task automatic architecture, and the like. It is difficult to form architecture with low generalization error because the existing technology searches in large units.

Therefore, there is a need for an efficient artificial intelligence system that may perform searches in smaller units to reduce the generalization error.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides an artificial intelligence system and a method for searching for an optimal model that automatically search for a precise structure and learn a task through an architecture search process in channel units without previously defining the degree of difficulty of a task or an amount of training data.

According to an embodiment of the disclosure, a method for searching for an optimal model of an artificial intelligence system includes: receiving, by each of the plurality of operators included in a first node, a plurality of first channels in units of channel among a plurality of channels included in at least one first channel group; deriving, by each of the plurality of operators included in the first node, the respective first parameter weight indexes corresponding to weights of the respective first parameters by calculating the respective first parameters corresponding to the received plurality of first channels with the received first channels; generating and outputting at least one second channel group by combining at least one first channel and the other channel of the plurality of first channels; receiving, by each of the plurality of operators included in a second node, a plurality of second channels in units of channel among a plurality of channels included in at least one generated second channel group; and deriving, by each of the plurality of operators included in the second node, the respective second parameter weight indexes corresponding to weights of the respective second parameters by calculating the respective second parameters corresponding to the received plurality of second channels with the received second channels.

Each of the first parameter and the second parameter may include a plurality of weights, in the deriving of the first parameter weight indexes, absolute values of the plurality of weights for the respective first parameters may be summed, and the first parameter weight indexes may be derived based on the summed absolute value of the respective first parameters, and in the deriving of the second parameter weight indexes, absolute values of the plurality of weights for the respective second parameters may be summed, and the second parameter weight indexes may be derived based on the summed absolute value of the respective second parameters.

The method may further include identifying a first parameter having the highest first parameter weight index among the plurality of first parameters as a first architecture parameter, and identifying a second parameter having the highest second parameter weight index among the plurality of second parameters as a second architecture parameter.

The method may further include removing the first parameters other than the identified first architecture parameter among the plurality of first parameters, and removing the second parameters other than the identified second architecture parameter among the plurality of second parameters.

The method may further include: receiving only the first channel corresponding to the identified first architecture parameter among the plurality of channels included in the first channel group; modifying an error of weight of the first architecture parameter by calculating the first channel corresponding to the first architecture parameter with the first architecture parameter; generating and outputting one second channel group by combining the first channel corresponding to the first architecture parameter with the other channel; receiving only the second channel corresponding to the identified second architecture parameter among the plurality of channels included in the second channel group; and modifying an error of weight of the second architecture parameter by calculating the second channel corresponding to the second architecture parameter with the second architecture parameter.

In the receiving of the plurality of first channels in unit of channel, a first operator of the plurality of operators may receive the number of channels corresponding to the number of first parameters included in the first operator from each of the channels of at least one first channel group.

The other channel may include at least one of a first channel used for calculation in the first node or a channel which is not calculated in a previous node of the first node.

The first parameter may include a kernel of columns corresponding to the number of input channels and rows corresponding to the number of output channels.

According to another embodiment of the disclosure, an artificial intelligence system includes: an input interface configured to receive at least one first channel group including a plurality of channels; and a processor configured to include a plurality of cells, wherein each of the plurality of cells includes a plurality of nodes, and the processor receives, by each of the plurality of operators included in a first node, a plurality of first channels in units of channel among a plurality of channels included in at least one first channel group, derives, by each of the plurality of operators included in the first node, the respective first parameter weight indexes corresponding to weights of the respective first parameters by calculating the respective first parameters corresponding to the received plurality of first channels with the received first channels, generates and outputs at least one second channel group by combining at least one first channel and the other channel of the plurality of first channels, receives, by each of the plurality of operators included in a second node, a plurality of second channels in units of channel among a plurality of channels included in at least one generated second channel group, and derives, by each of the plurality of operators included in the second node, the respective second parameter weight indexes corresponding to weights of the respective second parameters by calculating the respective second parameters corresponding to the received plurality of second channels with the received second channels.

The processor may identify a first parameter having the highest first parameter weight index among the plurality of first parameters as a first architecture parameter, and identify a second parameter having the highest second parameter weight index among the plurality of second parameters as a second architecture parameter.

The processor may remove the first parameters other than the identified first architecture parameter among the plurality of first parameters, and remove the second parameters other than the identified second architecture parameter among the plurality of second parameters.

The processor may receive only the first channel corresponding to the identified first architecture parameter among the plurality of channels included in the first channel group, modify an error of weight of the first architecture parameter by calculating the first channel corresponding to the first architecture parameter with the first architecture parameter, generate and output one second channel group by combining the first channel corresponding to the first architecture parameter with the other channel, receive only the second channel corresponding to the identified second architecture parameter among the plurality of channels included in the second channel group, and modify an error of weight of the second architecture parameter by calculating the second channel corresponding to the second architecture parameter with the second architecture parameter.

A first operator of the plurality of operators of the processor may receive the number of channels corresponding to the number of first parameters included in the first operator from each of the channels of at least one first channel group.

The other channel may include at least one of a first channel used for calculation in the first node or a channel which is not calculated in a previous node of the first node.

The first parameter may include a kernel of columns corresponding to the number of input channels and rows corresponding to the number of output channels.

As described above, according to the diverse embodiments of the disclosure, the method for searching for the learning model of the artificial intelligence and the artificial intelligence system may search for the learning model in channel units.

In addition, the method for searching for the learning model of the artificial intelligence and the artificial intelligence system may variously and freely adjust sparsity for each of the operators, and may derive the optimal model as one-shot model for a macro-search space.

In addition, the method for searching for the learning model of the artificial intelligence and the artificial intelligence system may variously adjust the size of the learning model, and may reduce the generalization error.

The effects of the disclosure are not limited to the above-mentioned effects. That is, other effects that are not mentioned may be obviously understood by those skilled in the art from the description below.

BRIEF DESCRIPTION OF THE DRAWING FIGURES

The above and/or other aspects of the disclosure will be more apparent by describing certain embodiments of the present disclosure with reference to the accompanying drawings, in which.

DETAILED DESCRIPTION OF THE EXEMPLARY EMBODIMENTS

Figure 1:
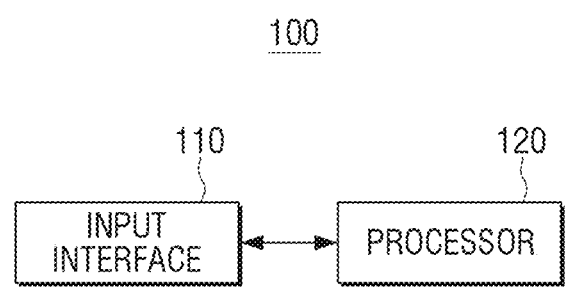
FIG. 1 is a block diagram illustrating an artificial intelligence system according to an embodiment of the disclosure.

Hereinafter, diverse embodiments will be described in more detail with reference to the accompanying drawings. Embodiments mentioned in the specification may be variously modified. A specific embodiment may be illustrated in the drawings and be described in detail in a detailed description. However, the specific embodiment illustrated in the accompanying drawings is provided only to allow diverse embodiments to be easily understood. Therefore, it should be understood that the spirit of the disclosure is not limited by the specific embodiment illustrated in the accompanying drawings, but includes all the equivalents or substitutions included in the spirit and the scope of the disclosure.

Terms including ordinal numbers such as 'first', 'second', and the like, may be used to describe various components, but such components are not limited by the above-mentioned terms. The terms are used only to distinguish one component from another component.

It should be further understood that terms "include" or "have" used in the specification specify the presence of features, numerals, steps, operations, components, parts mentioned in the specification, or combinations thereof, but do not preclude the presence or addition of one or more other features, numerals, steps, operations, components, parts, or combinations thereof. It is to be understood that when one element is referred to as being "connected to" or "coupled to" another element, it may be connected directly to or coupled directly to another element or be connected to or coupled to another element while having the other element interposed therebetween. On the other hand, it should be understood that when one element is referred to as being "connected directly to" or "coupled directly to" another element, it may be connected to or coupled to another element without the other element interposed therebetween.

Meanwhile, a term "module" or "~er/~or" for components used in the specification performs at least one function or operation. In addition, a "module" or a "~er/~or" may perform a function or an operation by hardware, software, or a combination of hardware and software. In addition, a plurality of "modules" or a plurality of "~ers/~ors" except for a "module" or a "~er/~or" performed by specific hardware or performed by at least one controller may be integrated in at least one module. Singular forms are intended to include plural forms unless the context clearly indicates otherwise.

In the description of the disclosure, the order of each step should be understood to be non-limiting, unless a preceding step must be performed logically and temporally before a next step. That is, except for the exceptional cases above, even if the process described in the next step is performed prior to the process described in the preceding step, the nature of the disclosure shall not be affected and the scope of the right shall be defined regardless of the order of the steps. In addition, in the specification, "A or B" is defined to mean not only selectively indicating one of A and B but also including both A and B. In addition, it is to be understood that the term "comprising" intended to encompass further including other components in addition to the components listed as being included.

Encoding/decoding may be applied to an information (data) transmission process performed in the specification, if necessary, and in the specification and claims, expressions describing the information (data) transmission process are to be construed as including encoding/decoding, even if not mentioned separately. In the specification, the expression of the form "transmission (transfer) from A to B" or "reception A from B" includes transmitting (transferring) or receiving while having another medium therebetween, and not necessarily expresses only directly transmitting (transferring) or receiving from A to B.

In the specification, only essential components necessary for explanation of the disclosure are described, and components not related to the essence of the disclosure are not mentioned. In addition, the specification should not be construed in an exclusive meaning that includes only the mentioned components, but should be construed in a non-exclusive meaning that may include other components as well.

Besides, in describing the disclosure, when it is decided that a detailed description for the known functions or configurations related to the disclosure may unnecessarily obscure the gist of the disclosure, the detailed description therefor will be abbreviated or omitted. On the other hand, each embodiment may be independently implemented or operated, but each embodiment may also be implemented or operated in combination.

Figure 2:
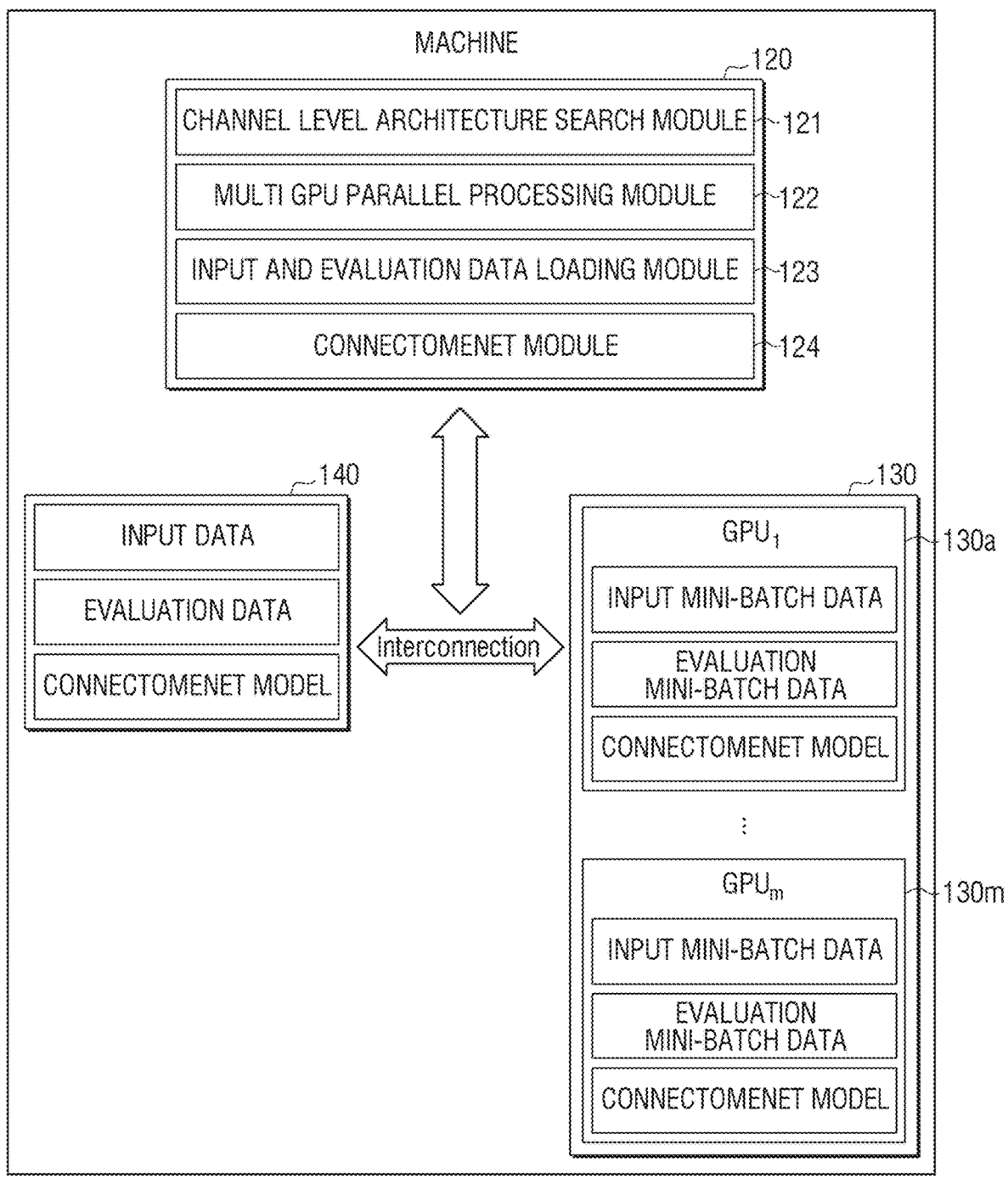
FIG. 2 is a detailed block diagram illustrating the artificial intelligence system according to the embodiment of the disclosure.

FIG. 1 is a block diagram illustrating an artificial intelligence system according to an embodiment of the disclosure and FIG. 2 is a detailed block diagram illustrating the artificial intelligence system according to the embodiment of the disclosure. The description will bed made with reference to FIGS. 1 and 2.

Referring to FIG. 1, an artificial intelligence system 100 includes an input interface 110 and a processor 120.

The input interface 110 is input with training data, evaluation data, or the like. The input training data and evaluation data may be stored in a memory 140. In addition, a learning model (ConnectomeNet model) of a basic structure may be stored in the memory. The memory 140 may include a larger amount of data than a GPU memory.

Referring to FIG. 2, the processor 120 may include a channel level architecture search module 121, a multi GPU parallel processing module 122, an input and evaluation data loading module 123, and a ConnectomeNet loading module 124. The processor 120 may search for an optimal model based on the input training data and the learning module of the basic structure. Meanwhile, the artificial intelligence system 100 may include a graphic processing unit (GPU) 130 for fast calculation and parallel processing of learning processes. The GPU 130 may include a plurality of individual GPUs 130a to 130m. The learning model of the basic structure may include a plurality of cell, and each cell may include a plurality of nodes. The individual GPUs 130a to 130m may perform a data processing for an individual cell or an individual node.

GPU 130 may be implemented separately from processor 120, but may be viewed as a portion of the processor 120 in a broad sense. The processor 120 according to the disclosure is described as a concept including the GPU 130 that may be physically implemented separately.

The input and evaluation data loading module 123 may load the input training data into the processor 120. The input training data may be training data that is created in the past.

The ConnectomeNet loading module 124 may load the learning module (e.g., one-shot model) of the basic structure including the cells and the nodes. The channel level architecture search module 121, the multi GPU parallel processing module 122, and the ConnectomeNet loading module 124 may perform a calculation of a neural network using the training data. The artificial intelligence system 100 may determine whether a result of inferring from the modules described above is a correct result using the evaluation data.

The learning process described above according to the disclosure is referred to as supervised learning. In addition, the result obtained by using the input training data is compared with the evaluation data, and a difference in the comparison is numerically expressed as a loss. Gradient data is data on how much each neuron affected a correct answer using the loss and how it should be corrected.

The data described above may be streamed to the GPU 130 (or the processor 120). Because the training data may have very large capacity, all training data may not be loaded on the GPU. Therefore, the training data may be streamed to each of the individual GPUs 130a to 130m in units of mini-batch. The ConnectomeNet loading module 124 may perform a loading process of the training data from the memory 140 to the GPU 130. The plurality of GPUs 130a to 130m may process the loaded training data and the neural network in parallel. In this case, the individual GPUs 130a to 130m may include a multiple core and a GPU memory, and may infer the neural network using the training data, the evaluation data, and the learning model of the basic structure transmitted through the processor 120. The multi GPU parallel processing module 122 may manage an entire task of each of the GPUs 130a to 130m.

The channel level architecture search module 121 may perform inference automation and model architecture automation operations of the artificial intelligence system 100 that precisely searches for an optimal model in units of channel. In the disclosure, an input channel is the smallest unit that may be searched, and architecture of the model may be finally configured through a combination of inter-channel connections. A final classifier is a final stage in which output features that pass through ConnectomeNet units in the ConnectomeNet model are collected, and one final classifier may be disposed for each task. The inference may be completed through the final classifier.

A search process of the artificial intelligence learning model will be hereinafter described.

Figure 3A:
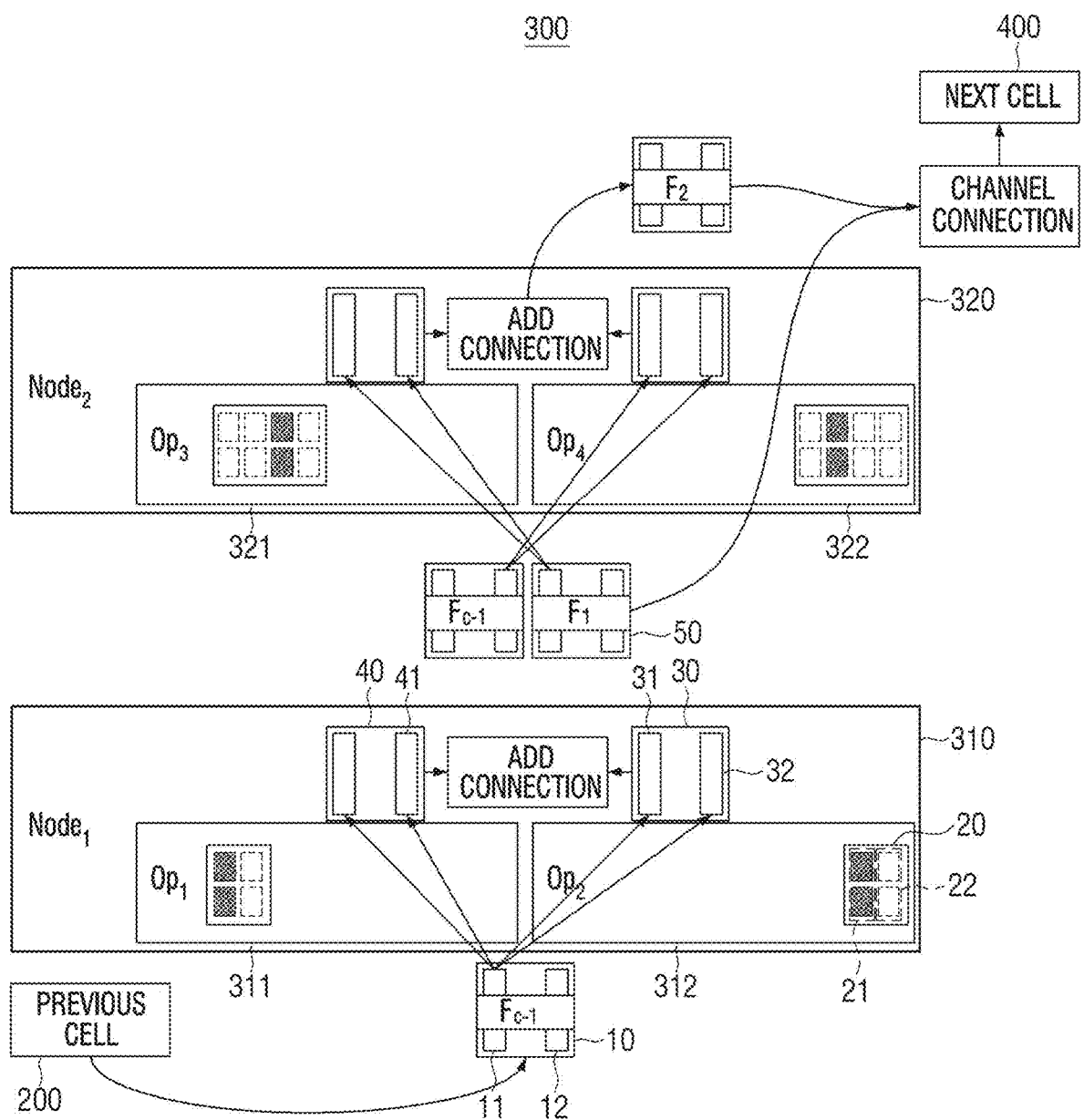
FIGS. 3A and 3B are diagrams for describing a process of searching for an optimal model according to an embodiment of the disclosure.
Figure 3B:
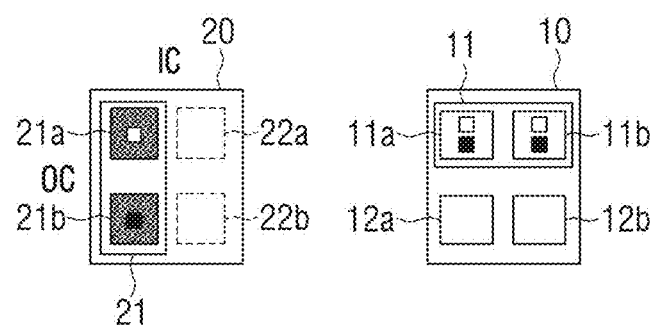

FIG. 3A is a diagram for describing a method of searching for an optimal model according to an embodiment of the disclosure. FIG. 3A illustrates a schematic diagram of a model for performing a weight analysis, and FIG. 3B illustrates a diagram for describing a calculation process before searching for a channel level architecture (or a weight analysis process). A weight analysis process will be described with reference to FIGS. 3A and 3B.

The artificial intelligence system according to the disclosure may sequentially perform a weight analysis process, a channel level architecture search process, and a re-training process. The weight analysis process may be a process of modifying weights of parameters of a basic one-shot model based on the input data and evaluation data. The channel level architecture search process may be a process of comparing the modified parameter weights and generating (or searching for) an optimal model by leaving only a parameter having the highest weight and removing the remaining parameters. The re-training process may be a process of modifying an error of the weight of the generated optimal model. Each process will be hereinafter described in detail.

The artificial intelligence system according to the disclosure requires a process of deriving an input channel index for configuring an architecture that may learn one-shot model capable of expressing a large search space by combining input channel units and derive the optimal model. The index derivation may be performed in the weight analysis process, and the artificial intelligence system may learn the parameters in a single model as much as a predetermined epoch through the weight analysis process, and then compare and analyze each weight in the single model. The artificial intelligence system may include a plurality of cells, one cell may include a plurality of nodes, and each node may include a plurality of operators.

As an example, as illustrated in FIG. 3A, one cell 300 may include two nodes 310 and 320. A first node 310 may include first and second operators 311 and 312, and a second node 320 may include third and fourth operators 321 and 322. One input channel group 10 may include two channels 11 and 12. In addition, one output channel group 50 may also include two channels.

One channel 11 of the input channel group 10 may be input to the second operator 312. Although FIG. 3A illustrates one input channel group 10, a plurality of input channel groups may exist. Because the second operator 312 includes parameters 21 and 22 corresponding to two channels, the second operator 312 may be input with the two channels. That is, all of the two channels 11 and 12 of the input channel group 10 may be input to the second operator 312, and any two channels combined among the plurality of input channel groups may also be input to the second operator 312. If the two channels 11 and 12 of the input channel group 10 are input to the second operator 312, the second operator 312 may perform calculations with the two parameters 21 and 22 corresponding to the input two channels 11 and 12. For example, a first parameter 21 of the two parameters may correspond to the first input channel 11, and a second parameter 22 may correspond to the second input channel 12. The second operator 312 may perform a calculation between the input channel and the corresponding parameter, change weight through learning, and derive an index according to the changed weight. In addition, the second operator 312 may generate an output channel group 30 by calculating the input first channels 11 and 12. The first operator 311 may also generate an output channel group 40 by calculating the input first channels 11 and 12 in a similar manner. Although FIG. 3A illustrates a case in which the number of the first input channel group 10 is one, a plurality of first input channel groups 10 may exist, and the first operator 311 and the second operator 312 may be input with a plurality of first channels which are different from each other.

The artificial intelligence system may generate a second channel group 50 by combining one first channel and the other channel of the plurality of first channels. For example, the other channel may be the first channel used for the calculation in the first node 310, and may also be a channel not calculated in a previous node or a channel calculated in a previous cell. Individual channels included in the second channel group 50 may be input to a third operator 321 and a fourth operator 322 included in the second node 320. In addition, a plurality of second channel groups 50 to be input to the second node 320 may exist. As illustrated in FIG. 3A, combined two channels among a plurality of input channel groups $F_1$ and $F_{c-1}$ may be input to the third operator 321 and the fourth operator 322 of the second node 320, respectively. A process of the second node 320 being input with the second channel, performing a calculation between an input channel and a corresponding parameter, changing weight through learning, and deriving an index according to the changed weight is similar to the calculation process in the first node 310 described above. An output channel group which is output from the second node 320 may be transferred to a next node or a next cell 400.

Referring to FIG. 3B, an operator may have one output channel group having the same number of channels, and each channel may be connected to the same input channel. The operator 312 may include a parameter 20 corresponding to an input channel and an output channel. The parameter 20 may include kernels 21a, 21b, 22a, and 22b of columns corresponding to the number of channels included in the input channel and rows corresponding to the number of channels included in the output channel group. For calculation with the parameter 20 included in the operator, the input channels in the input channel group 10 may be configured in kernel forms 11a, 11b, 12a, and 12b so as to correspond to the kernels of the parameter.

One parameter 21 corresponding to one channel of the input channel group 10 may have high weight. The parameter 21 having the high weight may be an architecture parameter. In addition, the remaining parameters may be removed.

Figure 4A:
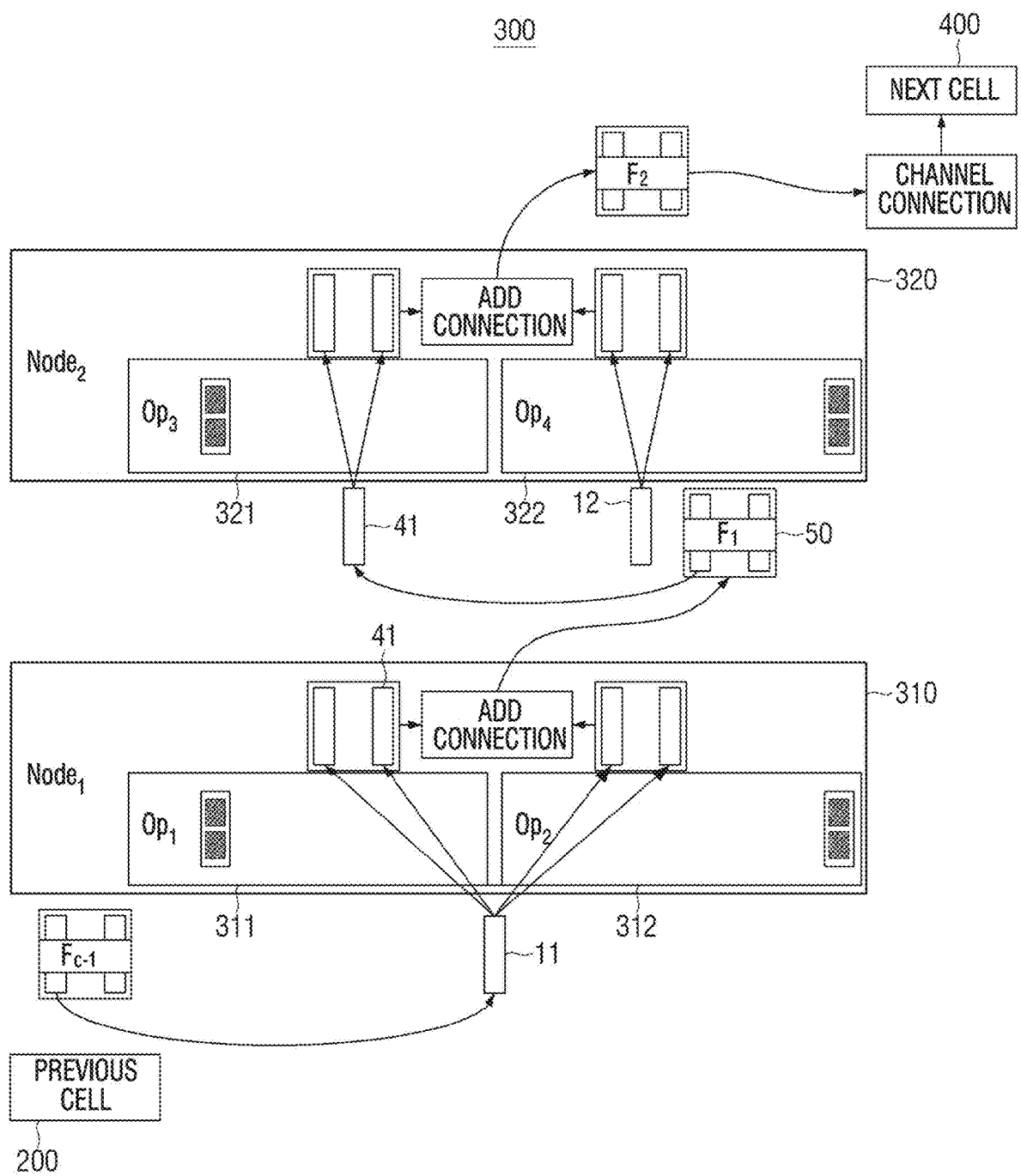
FIGS. 4A and 4B are diagrams for describing a searched optimal model according to an embodiment of the disclosure.
Figure 4B:
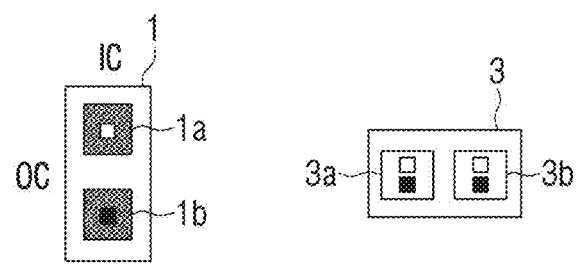

FIG. 4A is a diagram for describing a searched optimal model according to an embodiment of the disclosure. FIG. 4A illustrates a schematic diagram of a model for performing a re-training process after performing a channel level architecture search process and FIG. 4B illustrates a diagram for describing a calculation process after the channel level architecture search. A channel level architecture search process and a re-training process will be described with reference to FIGS. 4A and 4B.

As described above, each operator may include a plurality of parameters, and each of the plurality of parameters may be assigned with a weight index. The artificial intelligence system may identify one parameter having the highest parameter weight index among the plurality of parameters included in one operator as an architecture parameter. Meanwhile, each parameter may have a plurality of weights, and the artificial intelligence system may sum absolute values of the plurality of weights included in each parameter and derive a weight index based on the summed absolute value. In addition, the artificial intelligence system may compare derived weight indexes corresponding to the respective parameters with each other and identify a parameter corresponding to the largest weight index as the architecture parameter. The artificial intelligence system may remove parameters other than the architecture parameter identified for each operator.

The above-mentioned process is the channel level architecture search process, and may be performed in the first node 310 and the second node 320 (or also including other nodes and other cells) in the same manner.

A basic data processing process of the model illustrated in FIG. 4A is similar to that described in FIG. 3A. However, in FIG. 4A, because the parameters other than the architecture parameter are removed, a simple structure is illustrated as compared with the one-shot model of FIG. 3A. Because the optimal model illustrated in FIG. 4A includes only the architecture parameter, each node (or each operator) may be input with only a channel corresponding to the architecture parameter. That is, the number of channels 11 input to each node is significantly small, only input channel 11 may be input to the first node unlike the model in which an existing input channel group is used as an input. In addition, only the channel 41 output from the first node 310 or the channel 12 transferred from the previous node (or the previous cell) may be generated as the second channel group 50, and only the channel corresponding to the architecture parameter included in the second node 320 may be input to the second node 320.

That is, each of the operators 311 and 312 of the first node 310 may be input with only the first channel 11 corresponding to the identified first architecture parameter among the plurality of channels included in the first channel group $F_{c-1}$. In addition, the artificial intelligence system may modify an error of weight of the first architecture parameter by calculating the first channel 11 corresponding to the first architecture parameter with the first architecture parameter. The artificial intelligence system may generate two channel groups through the first node 310, and when the two channel groups are calculated using an add connection, the second channel group 50 having the same number of channels as the two channel groups may be generated and output.

Each of the operators 321 and 321 of the second node 322 may be input with only the second channels 12 and 41 corresponding to the identified second architecture parameters among the plurality of channels included in the second channel group 50. In addition, the artificial intelligence system may modify an error of weight of the second architecture parameters by calculating the second channels 12 and 41 corresponding to the second architecture parameters with the second architecture parameters.

The above-mentioned process is the re-training process, and when the re-training process ends, an optimal model may be generated.

Referring to FIG. 4B, the operator may include one parameter 1, and the number of the input channel 3 may also be one. Meanwhile, in a case in which the number of the output channels is two, the parameter 1 may include two kernels 1a and 1b, respectively, so as to correspond to the output channels, and the input channel 3 may also be constituted in two kernel forms 3a and 3b so as to correspond to the parameter 1. The operator may perform a calculation only on the channel corresponding to the architecture parameter after removing the channel to be removed. Although FIG. 4B illustrates an example of one input channel 3 and the two output channels, the number of the input channel and the output channels may be variously set.

That is, the example illustrated in FIGS. 4A and 4B is one example, and in some cases, the artificial intelligence system may identify a predetermined number of architectural parameters in the order of the parameter having the largest weight, and remove the remaining parameters.

Figure 5:
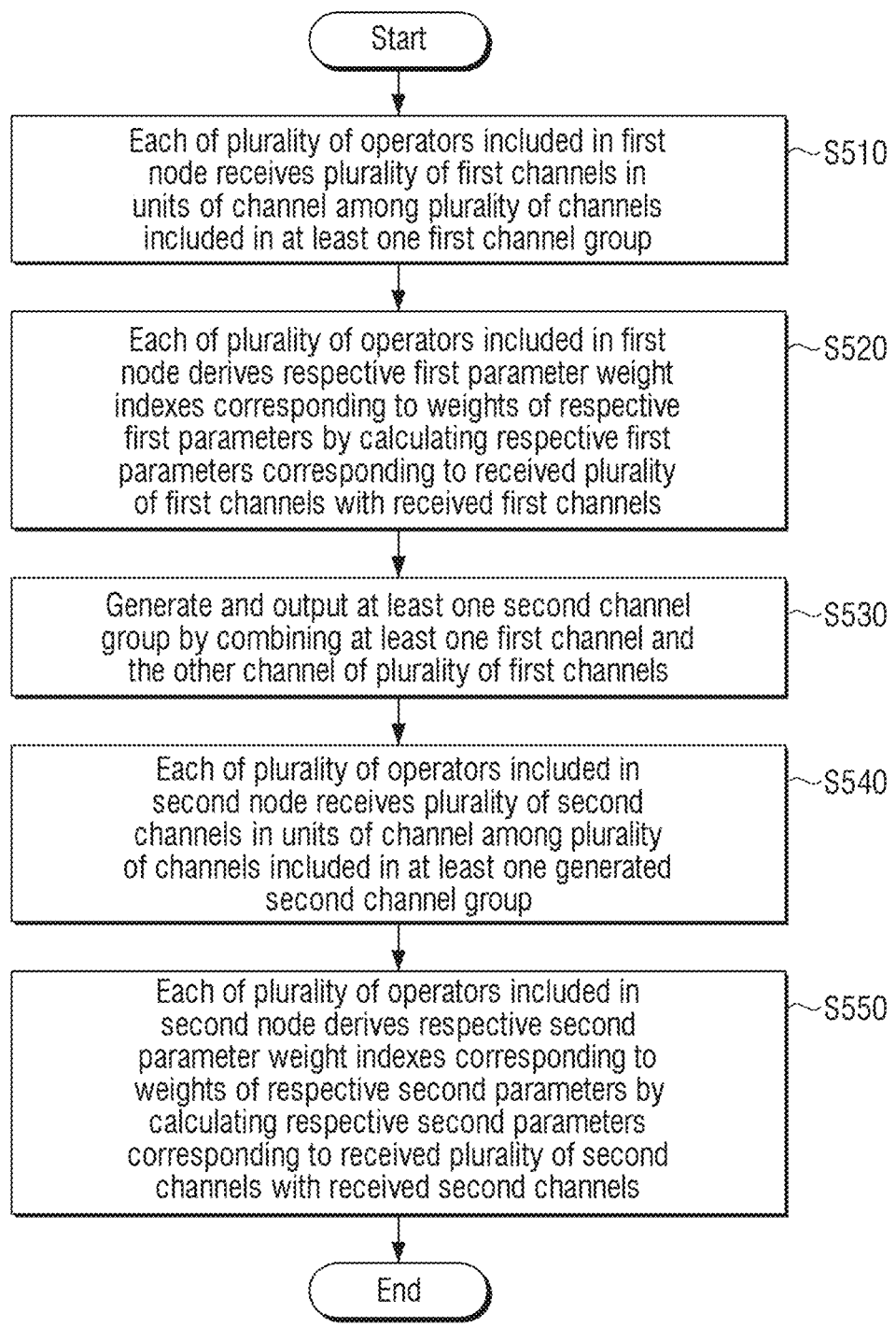
FIG. 5 is a flowchart of a method for searching for an optimal model of an artificial intelligence according to an embodiment of the disclosure.
Figure 6:
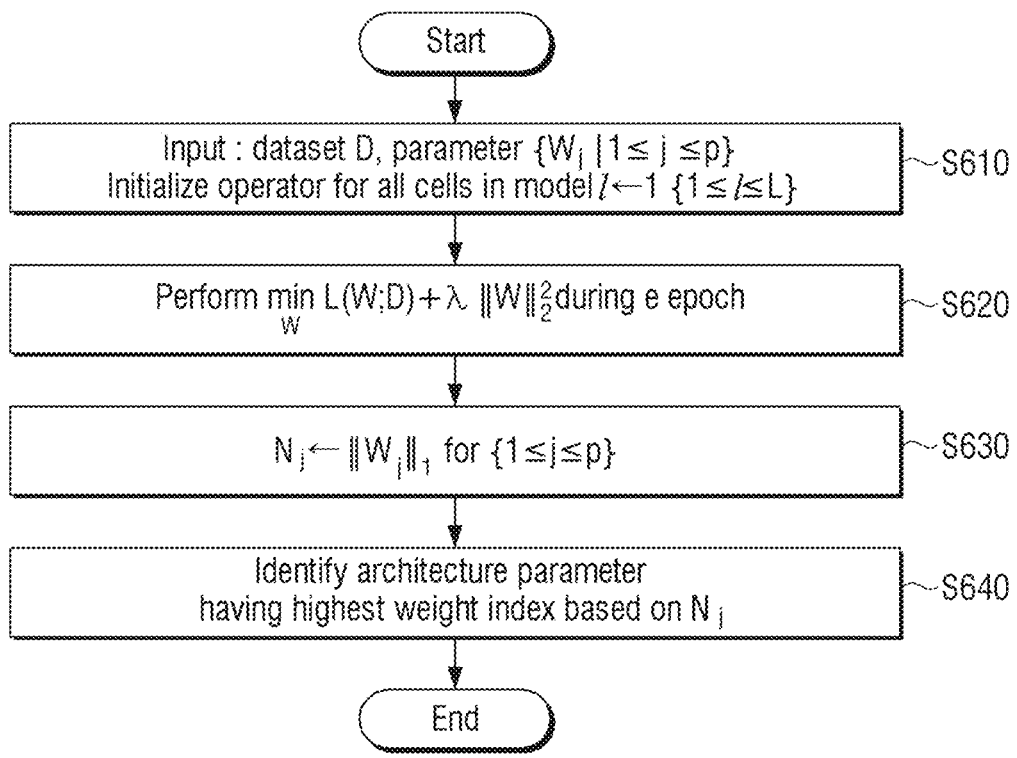
FIG. 6 is a flowchart of a weight analysis process according to an embodiment of the disclosure.

FIG. 5 is a flowchart of a method for searching for an optimal model of an artificial intelligence according to an embodiment of the disclosure.

When a learning model of a basic structure is loaded on the artificial intelligence system, the artificial intelligence system may include a plurality of cells. In addition, the cell may include a plurality of nodes, and the node may include a plurality of operators.

In the artificial intelligence system, each of the plurality of operators included in a first node receives a plurality of first channels in units of channel among a plurality of channels included in at least one first channel group (S510). The first channel group may be an input channel group which is input to the first node. A plurality of first channel groups may exist, and the first channel group may include a plurality of first channels. The artificial intelligence system may receive the number of channels corresponding to the number of parameters included in the first node from each of the first channel groups. For example, two first channel groups may exist, and each of the first channel groups may include two channels. Therefore, there may be four input channels from the first to fourth channels. In addition, the first node may include parameters corresponding to the two channels. Therefore, the first node may receive the channel as one combination of six possible combinations ($_4C_2$) among the first to fourth channels.

In the artificial intelligence system, each of the plurality of operators included in the first node derives the respective first parameter weight indexes corresponding to weights of the respective first parameters by calculating the respective first parameters corresponding to the received plurality of first channels with the received first channels (S520). For example, each of the first parameter and the second parameter may include a plurality of weights. The artificial intelligence system may sum absolute values of the plurality of weights for the respective first parameters, and derive the first parameter weight indexes based on the summed absolute value of the respective first parameters. In addition, similarly, the artificial intelligence system may sum absolute values of the plurality of weights for the respective second parameters, and derive the second parameter weight indexes based on the summed absolute value of the respective second parameters.

The artificial intelligence system may generate and output at least one second channel group by combining at least one first channel and the other channel of the plurality of first channels (S530). The generated second channel group may be an input channel group of the second node. Meanwhile, the other channel may include at least one of the first channel used for calculation in the first node or a channel which is not calculated in a previous node of the first node.

In the artificial intelligence system, each of the plurality of operators included in a second node receives a plurality of second channels in units of channel among a plurality of channels included in at least one generated second channel group (S540). The process of receiving the second channel by the second node may be similar to the process of receiving the first channel by the first node.

In the artificial intelligence system, each of the plurality of operators included in the second node derives the respective second parameter weight indexes corresponding to weights of the respective second parameters by calculating the respective second parameters corresponding to the received plurality of second channels with the received second channels (S550). The process of deriving the second parameter weight indexes may be similar to the process of deriving the first parameter weight indexes.

Meanwhile, the artificial intelligence system may perform a channel level architecture search process and a re-training process after the processes described above.

That is, the artificial intelligence system may identify a first parameter having the highest first parameter weight index among the plurality of first parameters as a first architecture parameter, and identify a second parameter having the highest second parameter weight index among the plurality of second parameters as a second architecture parameter. The artificial intelligence system may remove the first parameters other than the identified first architecture parameter among the plurality of first parameters, and remove the second parameters other than the identified second architecture parameter among the plurality of second parameters. The artificial intelligence system may perform the re-training process after the channel level architecture search process.

The artificial intelligence system may receive only the first channel corresponding to the identified first architecture parameter among the plurality of channels included in the first channel group, and may modify an error of weight of the first architecture parameter by calculating the first channel corresponding to the first architecture parameter with the first architecture parameter. In addition, the artificial intelligence system may generate and output one second channel group by combining the first channel corresponding to the first architecture parameter with the other channel.

The artificial intelligence system may receive only the second channel corresponding to the identified second architecture parameter among the plurality of channels included in the second channel group, and may modify an error of weight of the second architecture parameter by calculating the second channel corresponding to the second architecture parameter with the second architecture parameter.

Meanwhile, the first parameter may include a kernel of columns corresponding to the number of first channels included in one first channel group and a kernel of rows corresponding to the number of second channels included in one second channel group. In addition, the second parameter may also include a kernel of columns corresponding to the number of channels included in an input channel group and a kernel of rows corresponding to the number of channels included in an output channel group.

A learning process that proceeds with a predetermined number of epochs (e.g., 630 epochs) with L2-regularization to learn and perform tasks may be referred to as L2-training. In addition, a process of analyzing magnitude between the weights of the parameters corresponding to the channels on a one-to-one basis after performing a predetermined number of epoch times (e.g., 150 epochs) is referred to as a weight analysis process. As a result of the weight analysis process, an index for an important input channel among the input channel groups may be derived.

An architecture search in units of channel for the derived index may be referred to as a channel level architecture search process. The learning of the artificial intelligence system may be terminated after L2-training is performed on the finally derived optimization model.

In the disclosure, the first and second nodes, the first and second channel groups, the first and second channels and the like do not physically mean one, but may include a plurality of configurations included in the same step. That is, a plurality of first and second channel groups may exist, and a plurality of first and second channels may also exist.

In addition, as described above, the input data, the evaluation data, and the learning model of the basic structure may be loaded onto the individual GPUs and may also be processed in the individual GPUs.

FIG. 7 is a flowchart of a weight analysis process according to an embodiment of the disclosure.

Referring to FIG. 7, the artificial intelligence system may receive input data and parameters. In addition, the artificial intelligence system may initialize operators for all cells in the model (S610). D means the input data, and a parameter $W_j$ means a parameter corresponding to one channel, which is a unit in which the architecture is to be determined. j means an index for one parameter.

One-shot model of the artificial intelligence system may include a total of p parameters and may include a total of L operators. Because the weight analysis does not need to consider cell or node unit, the model of the artificial intelligence system may be classified into one index unit as if the model itself is constituted by only of operator, except for cell or node concept to distinguish the operator.

The artificial intelligence system may learn one-shot model (S620). e is a predefined hyperparameter.

The artificial intelligence system may allocate L1-norm of the parameter to $N_j$ (S630). The artificial intelligence system may identify an architecture parameter having the highest weight index based on $N_j$ (S640). A size of the parameter group may be (OC×IC×kernel height×kernel width), and a size of one parameter may be (OC×kernel height×kernel width). FIG. 3A illustrates an example in which the second operator among a total of p $W_j$ has two $W_j$ and k in the second operator is one. k is a predefined hyperparameter. If the second operator has $W_3$ and $W_4$, the artificial intelligence system compares $N_3$ and $N_4$, and if $N_3$ is greater than $N_4$, then index 3 may be added to I.

If the above-mentioned process is performed for all operators, the artificial intelligence system returns the stored index I, and each element of I can be matched to the architecture parameter on a one-to-one basis. I is an important index for a parameter identified as having a weight as large as a predefined number of $N_j$ and a process of leaving only the channel and parameter corresponding to I on a one-to-one basis and removing may be the channel level architecture search process.

After the weight analysis process, the channel level architecture search process may be performed. Referring to FIG. 3, $F_{(c-1)}$ may be an output channel group of a previous cell, and $F_1$ is an output channel group of the first node. The third operator and the fourth operator may be input with $F_{(c-1)}$ and $F_1$, respectively. The operator has the two input channel groups, and the channel level architecture search process may derive an optimal model by removing channels not corresponding to the index I derived in the weight analysis process.

After the channel level architecture search, the artificial intelligence system may have advantages in terms of sparsity and calculation cost. In the case of a general manner in FIG. 3A, the third operator 321 may receive all two channels, but in the system according to the disclosure, because only one channel 41 may be input to the third operator 321, sparsity of the optimal model may be increased. In addition, when the model includes the same number of operators, the more sparse the connection between the input and output channels, the lower the generalization error of the model. The sparsity may vary depending on implementation, but as an example, when the input channel group of 256 channels is divided and calculated into four branches, sparsity of 75% may be guaranteed by dividing and calculating by 64 channels.

In addition, the higher the calculation density, the more advantageous for parallel processing. The artificial intelligence system according to the disclosure may be advantageous for the parallel processing because it reduces the generalization error of the model by making the inter-channel group connection in the optimal model thin and processes the calculation itself densely. The reason why the calculation density may be increased may be described with reference to FIGS. 3A and 4A. In order for the model of FIG. 3A to perform the same calculation as in FIG. 4A, a total of four operators are required, and in a state in which an input channel included in the input channel group has only one (the other input channel is 0), the parameter corresponding to the input channel is also one, as a result, all the other parameters should be 0. In addition, because the calculation between the four input channels and the four parameters must be performed, it can be said that it is in a sparse state with many unnecessary calculations. In the case of the model of FIG. 5, because there is only one parameter and one input channel of the operator, only the required calculation is performed and calculation density is high.

In the case of a memory copy calculation that may be performed in the disclosure, the cost for the memory copy calculation may be similar to other existing technologies, because it occurs similarly in the related art.

The artificial intelligence system according to the disclosure may derive the optimal model by performing the architecture search for a larger search space at a time using one-shot model. That is, the search space will be defined based on the related art as first operation connection $(f_{c-1})\times$ second operation connection $(F_{c-1})\times$third operator connection $(F_{c-1}, F_1)\times$fourth operator connection $(F_{c-1}, F_c)$, and the number of cases is $1\times1\times2\times2=4$, but a search space of the artificial intelligence system according to the disclosure that receives in unit of channel may have a much larger search space of $2\times2\times4\times4=64$.

The reason why the artificial intelligence system according to the disclosure is advantageous in the search for the above-described large search space is that because it does not use a controller RNN or a genetic algorithm, it completes the search at a time using one-shot model, without having to generate, learn, and search for the number of cases of a child model of the architecture for the connection that each operator chooses.

The above-mentioned difference becomes larger as the number of operators in the cell increases. The greater the number of operators, and the larger the input channel group, the search space of the artificial intelligence system according to the disclosure may be exponentially larger.

In addition, advantages of the disclosure will be described in terms of efficient use of input channels. In the case of the related art, because the connection is formed in units of an input channel group, the system may be connected to 50% of the two input channel groups. In one operator, sparsity is always connected to a 50% input channel group. Therefore, the system according to the related art may not usefully use features.

On the other hand, because the system of the disclosure receives data in units of channel, in a case in which the system may receive four input channels, the system may have a total of four cases in which if the system receives only one input channel, it is 25%, if the system receives two input channels, it is 50%, if the system receives three input channels, it is 75%, and if the system receives four input channels, it is 100%, and it is possible to constitute efficient sparsity corresponding to the number of various cases.

The method for searching for the learning model of the artificial intelligence system according to the diverse embodiments described above may also be provided as a computer program product. The computer program product may include a software program (S/W) itself or a non-transitory computer readable medium in which the S/W program is stored.

The non-transitory computer readable medium is not a medium that stores data for a short time such as a register, a cache, a memory, or the like, but means a medium that semi-permanently stores data and is readable by a machine. In detail, the various application or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

What is claimed is:

1. A controlling method of electronic apparatus for searching for an optimal model of an artificial intelligence system including an input interface and a plurality of graphic processing units (GPUs), the method comprising:

receiving, through the input interface, a plurality of first channels in units of channel among a plurality of channels included in a first channel group;

obtaining, by a first graphic processing unit (GPU) among the plurality of GPUs, the respective first parameter weight indexes corresponding to weights of the respective first parameters by calculating the respective first parameters corresponding to the received plurality of first channels with the received first channels;

generating and outputting, by the first GPU, a second channel group by combining at least one first channel and the other channel of the plurality of first channels;

receiving, through the input interface, a plurality of second channels in units of channel among a plurality of channels included in the generated second channel group; and obtaining, by a second GPU among the plurality of GPUs, the respective second parameter weight indexes corresponding to weights of the respective second parameters by calculating the respective second parameters corresponding to the received plurality of second channels with the received second channels;

identifying, by the first GPU, a first parameter having the highest first parameter weight index among the plurality of first parameters as a first architecture parameter;

identifying, by the second GPU, a second parameter having the highest second parameter weight index among the plurality of second parameters as a second architecture parameter;

removing, by the first GPU, the first parameters other than the identified first architecture parameter among the plurality of first parameters;

removing, by the second GPU, the second parameters other than the identified second architecture parameter among the plurality of second parameters;

receiving, by the first GPU through the input interface, only the first channel corresponding to the identified first architecture parameter among the plurality of channels included in the first channel group;

modifying, by the first GPU, an error of weight of the first architecture parameter by calculating the first channel corresponding to the first architecture parameter with the first architecture parameter;

generating and outputting, by the first GPU, the second channel group by combining the first channel corresponding to the first architecture parameter with the other channel;

receiving, by the second GPU through the input interface, only the second channel corresponding to the identified second architecture parameter among the plurality of channels included in the second channel group; and modifying, by the second GPU, an error of weight of the second architecture parameter by calculating the second channel corresponding to the second architecture parameter with the second architecture parameter, wherein in the receiving of the plurality of first channels in unit of channel, a first operator included in the first GPU receives the number of channels corresponding to the number of first parameters included in the first operator from each of the channels of at least one first channel group.

2. The controlling method of electronic apparatus as claimed in claim 1, wherein each of the first parameter and the second parameter includes a plurality of weights, in the obtaining of the first parameter weight indexes, absolute values of the plurality of weights for the respective first parameters are summed, and the first parameter weight indexes are obtained based on the summed absolute value of the respective first parameters, and in the obtaining of the second parameter weight indexes, absolute values of the plurality of weights for the respective second parameters are summed, and the second parameter weight indexes are obtained based on the summed absolute value of the respective second parameters.

3. The controlling method of electronic apparatus as claimed in claim 1, wherein the other channel includes at least one of a first channel used for calculation in a first node or a channel which is not calculated in a previous node of the first node.

4. The controlling method of electronic apparatus as claimed in claim 1, wherein the first parameter includes a kernel of columns corresponding to the number of input channels and rows corresponding to the number of output channels.

5. An electric apparatus for an artificial intelligence system comprising:

an input interface configured to receive a first channel group including a plurality of channels;

a memory configured to store at least one instruction; and a processor including a plurality of graphic processing units (GPUs) and configured to control each of the plurality of GPUs corresponding to each of a plurality of cells including a plurality of nodes, wherein a first graphic processing unit (GPU), among the plurality of GPUs, is configured to receive, via the input interface, a plurality of first channels in units of channel among a plurality of channels included in the first channel group, the first GPU is configured to obtain the respective first parameter weight indexes corresponding to weights of the respective first parameters by calculating the respective first parameters corresponding to the received plurality of first channels with the received first channels, the first GPU is configured to generate and output a second channel group by combining one first channel and the other channel of the plurality of first channels, a second GPU, among the plurality of GPUs, is configured to receive, via the input interface, a plurality of second channels in units of channel among a plurality of channels included in the generated second channel group, the second GPU is configured to obtain the respective second parameter weight indexes corresponding to weights of the respective second parameters by calculating the respective second parameters corresponding to the received plurality of second channels with the received second channels, the first GPU is configured to identify a first parameter having the highest first parameter weight index among the plurality of first parameters as a first architecture parameter, and identify a second parameter having the highest second parameter weight index among the plurality of second parameters as a second architecture parameter, the first GPU is configured to remove the first parameters other than the identified first architecture parameter among the plurality of first parameters, and remove the second parameters other than the identified second architecture parameter among the plurality of second parameters, the first GPU is configured to receive only the first channel corresponding to the identified first architecture parameter among the plurality of channels included in the first channel group, the first GPU is configured to modify an error of weight of the first architecture parameter by calculating the first channel corresponding to the first architecture parameter with the first architecture parameter, the first GPU is configured to generate and output a second channel group by combining the first channel corresponding to the first architecture parameter with the other channel, the second GPU is configured to receive only the second channel corresponding to the identified second architecture parameter among the plurality of channels included in the second channel group, and the second GPU is configured to modify an error of weight of the second architecture parameter by calculating the second channel corresponding to the second architecture parameter with the second architecture parameter, wherein
- a first node of the plurality of nodes includes a first plurality of operators, and
- a first operator of the first plurality of operators is configured to receive the number of channels corresponding to the number of first parameters included in the first operator from each of the channels of the first channel group.

6. The electric apparatus for an artificial intelligence system as claimed in claim 5, wherein the other channel includes a first channel used for calculation in the first node or a channel which is not calculated in a previous node of the first node.

7. The electric apparatus for an artificial intelligence system as claimed in claim 5, wherein the first parameter includes a kernel of columns corresponding to the number of input channels and rows corresponding to the number of output channels.

* * * * *